United States Patent [19]

Lech, Jr. et al.

[11] Patent Number: 4,502,582
[45] Date of Patent: Mar. 5, 1985

[54] WET CLUTCH ASSEMBLY

[75] Inventors: Thaddeus Lech, Jr., Sterling Heights; Richard T. Popchock, Lake Orion, both of Mich.

[73] Assignee: Borg-Warner Corporation, Chicago, Ill.

[21] Appl. No.: 393,222

[22] Filed: Jun. 28, 1982

[51] Int. Cl.³ .................. F16D 25/063; F16D 43/284
[52] U.S. Cl. ........................... 192/85 AA; 192/103 F; 192/105 F; 192/106 F
[58] Field of Search ........... 192/85 AA, 85 A, 103 F, 192/105 F, 106 F, 0.076, 57, 70.28, 3.3, 3.31

[56] References Cited

U.S. PATENT DOCUMENTS

| | | | |
|---|---|---|---|
| 1,934,850 | 11/1933 | Fromaget | 192/70.28 X |
| 1,974,740 | 9/1934 | Gehres | 192/85 AA |
| 2,325,814 | 8/1943 | Tyler | 192/85 AA X |
| 2,328,090 | 8/1943 | Nutt et al. | 192/85 AA X |
| 2,328,091 | 8/1943 | Nutt et al. | 192/85 AA X |
| 2,694,478 | 11/1954 | Zeidler | 192/85 AA X |
| 2,876,743 | 3/1959 | Maki | 192/85 AA X |
| 3,064,780 | 11/1962 | Richards et al. | 192/106 F |
| 3,237,734 | 3/1966 | Jania | 192/0.076 X |
| 3,306,407 | 2/1967 | Smirl | 192/85 AA |
| 3,581,858 | 6/1971 | Haley | 192/106 F |
| 3,881,584 | 5/1975 | Marsch | 192/70.28 X |
| 4,018,309 | 4/1977 | Mery | 188/72.4 |
| 4,049,093 | 9/1977 | Vukovich et al. | 192/3.3 |
| 4,147,245 | 4/1979 | Folomin et al. | 192/85 AA |
| 4,189,829 | 2/1980 | Schneider et al. | 192/85 AA X |
| 4,238,020 | 12/1980 | Nerstad et al. | 192/105 F X |
| 4,355,710 | 10/1982 | Schilling | 192/85 A X |

FOREIGN PATENT DOCUMENTS 925952 5/1963 United Kingdom .......... 192/85 AA

Primary Examiner—Rodney H. Bonck
Attorney, Agent, or Firm—James A. Geppert

[57] ABSTRACT

A hydraulically-actuated wet clutch assembly which is responsive to torque or speed and is adapted to be utilized as a starting clutch for a continuously variable transmission or similar item. This clutch connects the continuously varying means to the driving gears when the engine speed is increased from idle rpm. The clutch will engage as the fluid pressure increases from idle rpm through a pressure responsive valve or directly with a piston area defined between a piston and a cylinder, with the cylinder and attached pressure plate being movable under pressure relative to the piston to engage a clutch plate located between the piston and movable pressure plate.

20 Claims, 9 Drawing Figures

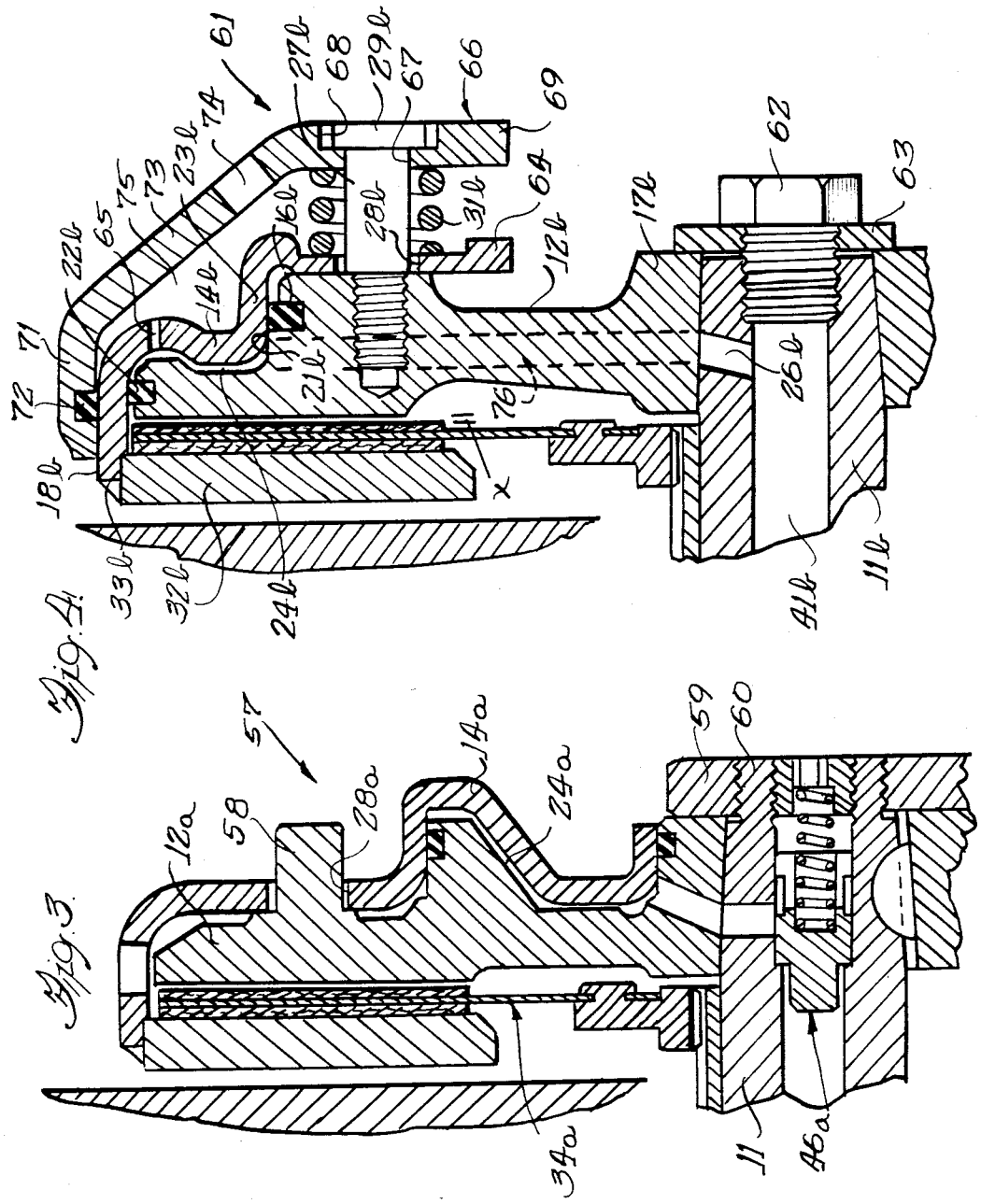

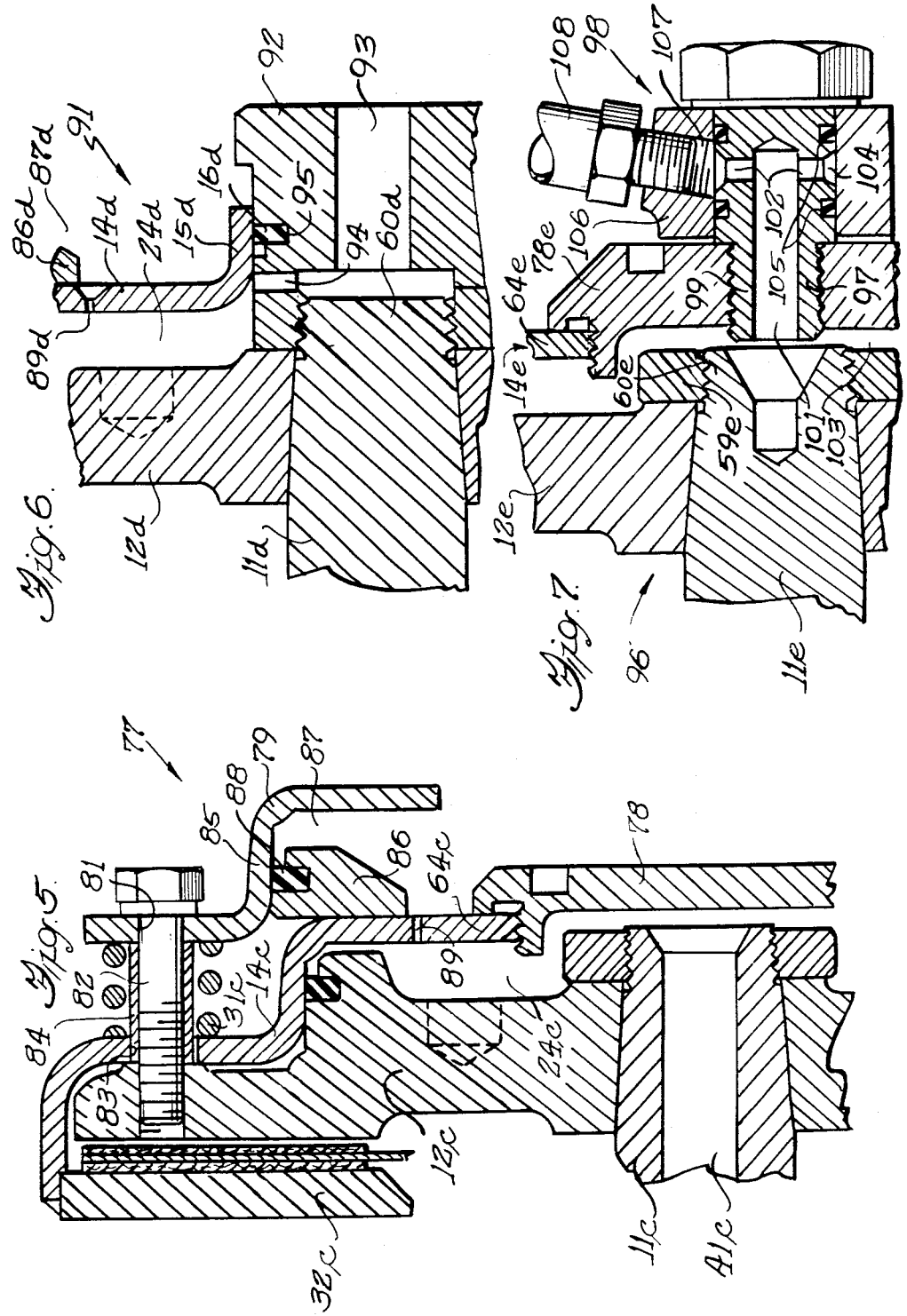

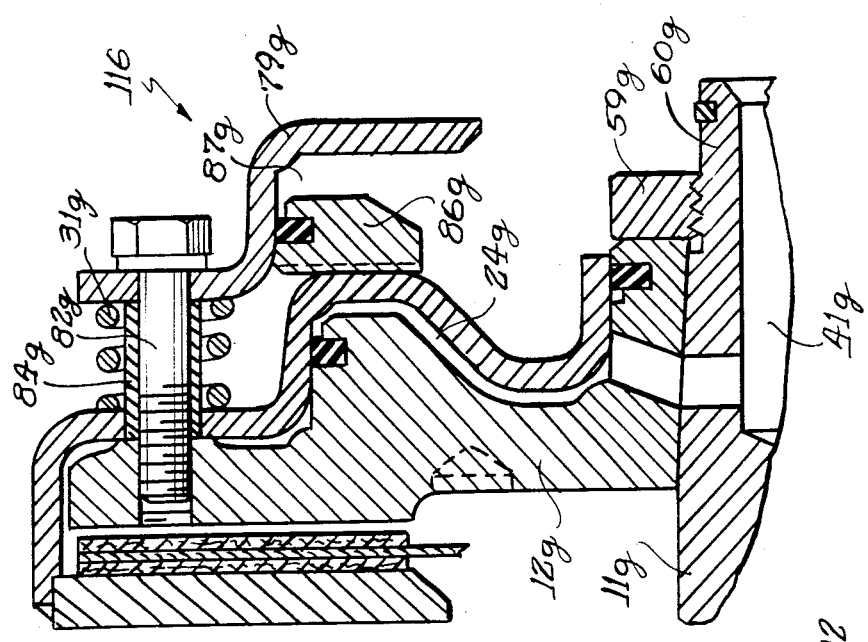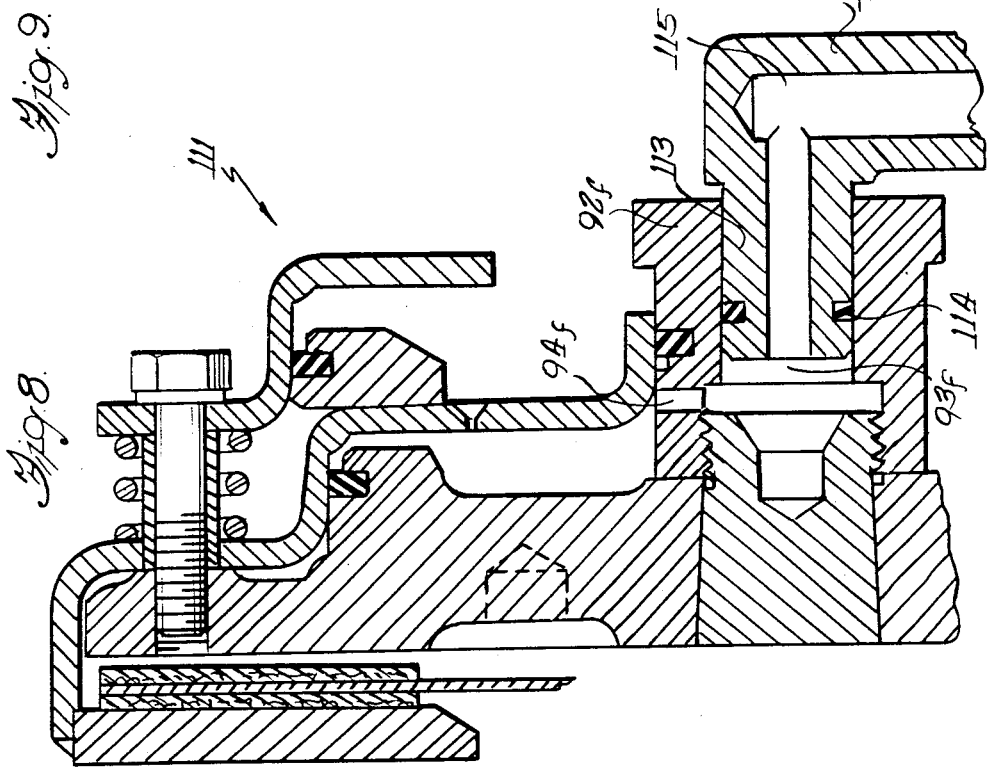

4,502,582

WET CLUTCH ASSEMBLY

BACKGROUND OF THE INVENTION

The present invention relates to a wet clutch system utilized as a starting clutch in a continuously variable transmission.

In hydraulically-actuated clutches employed for power transmission purposes, the actuation of the clutch is dependent upon the pressure of the hydraulic fluid acting on the engaging elements of the clutch. Where there is circulating fluid for cooling the frictional faces, the viscous drag resulting from oil flowing between the clutch plates when the clutch is in released position results in the problem that the clutch is not fully released. Thus, unwanted driving input to the transmission input shaft is created during disengagement of the clutch, with a brake being added to the output shaft with its resultant inefficiencies. Another possible solution to the viscous drag is the dumping or release of the oil flow to the clutch, but timing is critical for this arrangement.

Another problem resides in the centrifugal force of the rotating clutch which results in liquid pressure which may influence actuation of the clutch. Other problems include engine stalling during a rapid vehicle braking and smoothness of clutch engagement during acceleration. The present invention will in its various forms obviate the above enumerated problems.

SUMMARY OF THE INVENTION

The present invention comprehends the provision of a novel hydraulically-applied wet clutch assembly utilized as a starting clutch in a continuously variable transmission for an automotive vehicle. The clutch includes a piston secured to a driving shaft, a cylinder or housing encompassing the piston and providing an actuation chamber therebetween and a pressure plate secured to the housing and acting with the piston to sandwich a clutch plate therebetween; the clutch plate being operatively connected to a driven shaft leading to the driving gears. The piston has studs projecting therefrom through openings in the housing to prevent relative rotation therebetween and to aid in retraction of the pressure plate. As the speed of the driving shaft increases, the resulting increase in hydraulic pressure causes actuation of the clutch.

The present invention also comprehends the provision of a hydraulically applied wet clutch assembly having an adjustable control valve in the hydraulic pressure line movable between a first position allowing hydraulic fluid to enter the actuation chamber to cause clutch engagement and a second position for dumping of the fluid from the pressure chamber. The control valve will negate the effects of varying production tolerances and will disconnect the clutch assembly from hydraulic idling pressure to quickly disengage the clutch.

The present invention further comprehends the provision of a hydraulically-applied wet clutch assembly having cylinder retractor springs to disengage the clutch drive member with sufficient running clearance to prevent excessive idle creep on cold morning starts. These springs encompass guide pins which extend through the housing or cylinder and are secured to the piston on the driving shaft; the springs acting between the cylinder and enlarged heads on the pins to retract the cylinder towards to the axially stationary piston.

A further object of the present invention is the provision of a hydraulically-applied wet clutch that will respond quickly and uniformly with an increase in idling pressure to be applied smoothly without a "bump" or abrupt feel. Also, the centrifugal head generated in the piston cavity may be utilized to draw up the running clearance at idle rmp to cause the clutch to drag slightly so that it will not engage abruptly with a "bump" or with a time lag before it starts to engage.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 3 is a partial cross sectional view of a second embodiment of wet clutch assembly.

FIG. 4 is a partial cross sectional view of a third embodiment of wet clutch assembly without the control valve.

FIG. 5 is a partial cross sectional view of a fourth embodiment of wet clutch assembly.

FIG. 6 is an isolated cross sectional view of a fifth embodiment of wet clutch assembly with an alternate hydraulic supply fitting.

FIG. 7 is a cross sectional view of a sixth embodiment of wet clutch assembly with another hydraulic supply fitting.

FIG. 8 is a partial cross sectional view of a seventh embodiment of wet clutch assembly and a further hydraulic supply fitting.

FIG. 9 is a partial cross sectional view of an eighth embodiment of wet clutch assembly.

DESCRIPTION OF THE PREFERRED EMBODIMENTS

Figure 1:
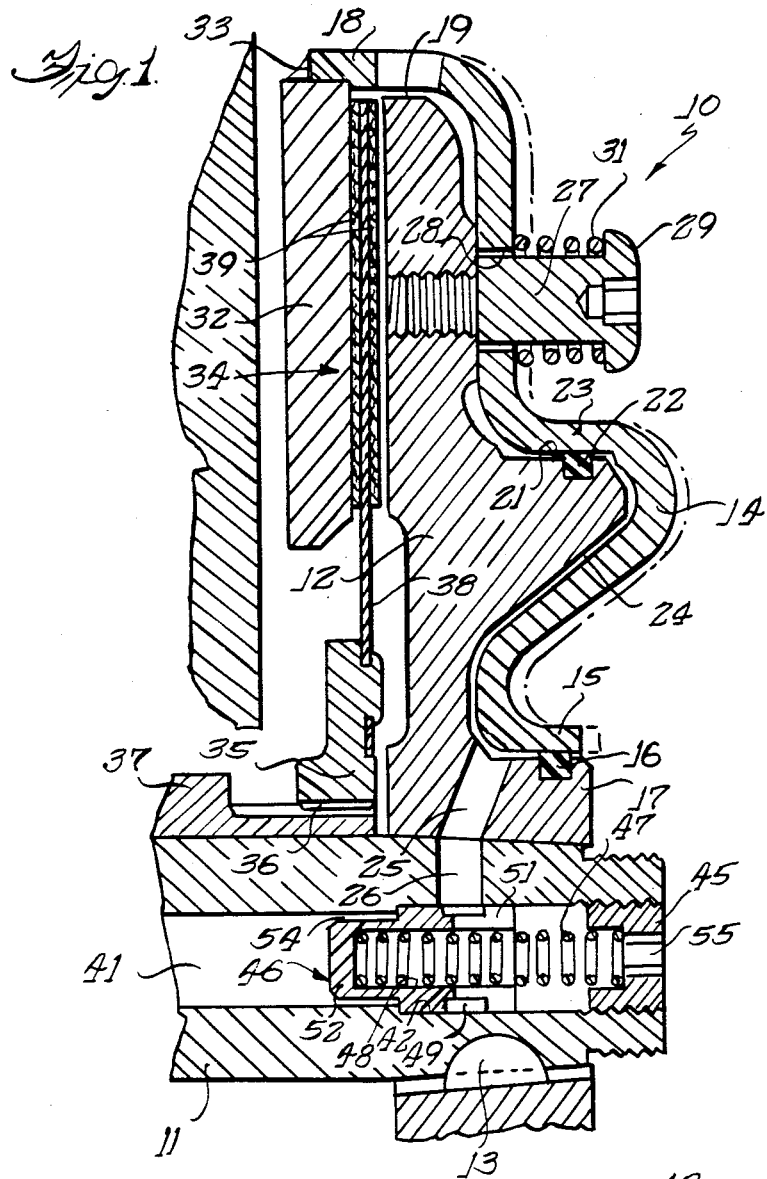
FIG. 1 is a partial cross sectional view of the novel hydraulically-applied wet clutch assembly of the present invention.
Figure 2:
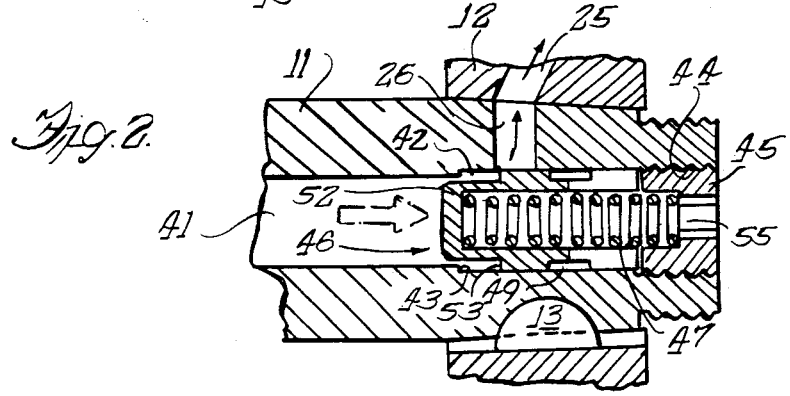
FIG. 2 is a cross sectional view of the control valve of FIG. 1 shown in the clutch-engaged position.

Referring more particularly to the disclosure in the drawings wherein are shown illustrative embodiments of the present invention, FIGS. 1 and 2 disclose a hydraulically-actuated wet clutch assembly 10 which may be utilized as a starting clutch in a continuously variable transmission (not shown), the assembly including a piston 12 secured such as by the key 13, to a rotating shaft 11 driven by the vehicle engine. A cylinder 14 substantially conforms to the contours of the piston 12 from an inner axially extending flange 15 engaging a pressure seal 16 on a piston shoulder 17 to an outer axially extending flange 18 projecting forwardly over the outer periphery 19 of the piston. Intermediate the inner and outer peripheries of the piston is an intermediate shoulder or ledge 21 having a pressure seal 22 cooperating with a shoulder 23 formed in the cylinder wall. The cylinder 14, the piston 12 and pressure seals 16 and 22 form a generally annular cavity 24 communicating with a feed hole 25 formed in the inner peripheral flange 17 of the piston, the feed hole being aligned with a passage 26 in shaft 11.

Radially outwardly of the shoulder 21 of the piston are a plurality of circumferentially spaced guide means, such as bolts or studs 27, threadingly secured in the rear surface of the piston and extending through openings 28 in the cylinder 14 to terminate in enlarged heads 29. Encompassing each stud is a retractor spring 31 having its opposite ends abutting the cylinder 14 and enlarged head 29. The cylinder 14 has an annular pressure plate 32 secured to the edge 33 of flange 18 so as to be spaced from the piston.

A driving member assembly 34 includes an annular hub 35 encompassing the drive shaft 11 and having an internal surface 36 in splined engagement with a cylindrical shaft 37 encompassing the shaft 11. A driven plate 38 is attached to the hub 35 and has annular friction facings 39,39 suitably secured to the opposite faces thereof. The shaft 11 has a central passage 41 in communication with a source of hydraulic pressure that varies with engine speed, such as a rotary pump; the passage being counterbored at 42 to define a shoulder 43. A control valve 46, which is positioned in passage 41, is preloaded by a compression spring 47, which in turn presses against an adjusting plug 45 threadingly engaging the internally threaded end 44 of the counterbore 42.

The control valve 46 has a cylindrical body received in the counterbore with a central recess 48 receiving the end of the spring 47, an annular groove 49 normally in alignment with the passage 26 in the shaft in radial alignment with the feed hole 25 and a rearwardly extending portion slotted at 51. A reduced diameter nose 52 defines a shoulder 53 adapted to abut the shoulder 43 of the counterbore 42; the nose being of a smaller diameter than the passage 41 to define an annular passage 54 therearound.

With the engine at idle rmp, the hydraulic pressure generated by a rotary pump (not shown) bears against the control valve nose 52, but is not sufficient to overcome the force of the spring 47. As the engine rpm is increased, the hydraulic pressure in the passage 41 increases proportionately until the force of the spring 47 is overcome and the valve 46 is shifted to the right (FIG. 2) to uncover the passage 26 and allow hydraulic fluid to pass through the annular passage 54, passage 26 and feed hole 25 into the cavity 24 to move the cylinder 14 rearwardly, away from the piston 12. Movement of the cylinder results in movement of the pressure plate 32 towards the piston to engage and squeeze the driving member assembly 34 and cause rotation of the cylindrical sleeve 37 to actuate the driving gears.

The clutch disengages when the pressure in the passage 41 drops sufficiently to allow the spring 47 to move the valve 46 to the left to interrupt communication between the cavity 24 and the passage 41 and vent the hydraulic pressure in the cavity through the feed hole 25, shaft feed hole 26, annular groove 49 in the control valve, and through the slots 51 and an opening 55 in the plug 45 to a sump. The springs 31 then act to move the cylinder 14 towards the piston 12 to close the cavity 24 and provide a running clearance for the driven member assembly 34.

The pressure of the spring 47 is adjusted by the plug 45 so that the hydraulic idling pressure will not displace the control valve 46 and the clutch will not be affected. The clutch will respond quickly and uniformly with an increase in hydraulic pressure to be applied smoothly without a "bump" or abrupt feel, and the control valve is adjustable whereby it can be set at assembly to select the precise time for start of engagement to negate the effects of varying production tolerances. Also, the cylinder retracting springs 31 act to disengage the clutch driven member with sufficient running clearance to prevent excessive idle creep on cold morning starts. The control valve will disconnect the clutch assembly from the hydraulic idling pressure so that it can disengage quickly when necessary by venting the clutch piston cavity to sump.

FIG. 3 discloses an alternate embodiment 57 of the wet clutch assembly which is substantially identical to FIGS. 1 and 2 with like parts having the same reference numeral with a script a. The difference between this assembly and the structure of FIG. 1 is the elimination of the retractor springs, with the pins 58 cast integral with the piston 12a and machined to be cylindrical without an enlarged head; the pins 58 projecting through the openings 28a in the cylinder 14a. Also, a nut 59 threadingly engages the exteriorly threaded end 60 of the rotating shaft 11a to secure the piston 12a thereon.

This assembly operates in an identical manner to the assembly in FIGS. 1 and 2, except the cylinder 14a is not returned towards the piston 12a by retractor springs. The centrifugal head of fluid in the cavity 24a is allowed to slightly apply the clutch to create a "no time required to start to apply the clutch" condition to present a "bump" or time lag when the engine speed is increased. Thus, at idle rpm, the centrifugal head generated in the piston cavity 24a draws up the running clearance for the driven member assembly 34a to cause the clutch to drag slightly; the clutch slipping with a drag torque insufficient to cause the vehicle to creep in gear. However, the clutch will disengage sufficiently during a rapid vehicle braking so that the engine will not stall.

FIG. 4 discloses a third embodiment of wet clutch assembly 61 with parts identical to those of FIG. 1 having the same reference numerals with the addition of a script b. This assembly includes a rotating shaft 11b having a hydraulic pressure passage 41b closed at the open end by a screw plug 62 and washer 63 bearing against the inner shoulder 17b of the piston 12b keyed to the shaft, and a cylinder 14b having a radially inwardly extending inner flange 64 with a plurality of openings 28b therein and an outer flange 18b engaging a pressure seal 22b and secured at the outer edge 33b to a movable pressure plate 32b. Intermediate the cylinder flanges 18b and 64 is an offset or shoulder 23b engaging a pressure seal 16b on an intermediate piston shoulder 21b, and the cylinder optionally has a hole 65 for a purpose to be described later.

A plurality of studs 27b have inner ends threadingly engaging the piston 12b and extending through the openings 28b and aligned openings 67 in a cover 66 to terminate in enlarged heads 29b received in complementary recesses 68 at openings 67. Retractor springs 31b encompass the studs with the ends bearing against the cover 66 and cylinder 14b to retract the pressure plate 32b. The cover 66 includes a radial portion 69 containing the openings 67, an axially extending portion 71 having a pressure seal 72 therein engaging the outer surface of cylinder flange 18b, and an intermediate angular portion 73 containing a drain hole 74.

This assembly is similar to that of FIG. 1 except the pressure cavity 24b between the pressure seals 16b and 22b is positioned radially outwardly beyond the retractor springs, and a piston cavity area 75 in the cover 66 is positioned to balance the cavity area 24b by being equal to the centrifugal head of the cavity area to prevent an increase in pressure plate load on the driven plate 38b when the assembly is rotated. There is no control valve in this assembly, and the feed hole 26b in the shaft is aligned with an elongated generally radial passage 76 in the piston opening into the shoulder 21b at the cavity 24b.

In operation, line pressure is constantly introduced to the cavity 24b from the passage 41b, even at idle rpm; however, the retractor springs 31b are sufficiently preloaded to maintain a running clearance "x" when the cavity 24b is charged with an idling line pressure. As engine speed increases, the line pressure increase activates movement of the cylinder and pressure plate, with the hole 65 acting to fill the balancing piston cavity 75 and thus act to balance the cavity 24b due to centrifugal force.

A fourth embodiment 77 is shown in FIG. 5, which is similar to the structure of FIG. 1 except that the inner radial flange 64c of the cylinder 14c is dead-ended with a plug 78 threadingly engaging the flange to eliminate an internal diameter lip seal. A clutch cover 79 has openings 81 receiving threaded bolts 82 threadingly secured to the piston 12c and extending through enlarged openings 83 in the cylinder 14c, and a sleeve 84 encompasses each bolt 82 with its opposite ends abutting the piston 12c and the cover 79 to maintain the spacing therebetween. Retractor springs 31c encompass the sleeves 84 and abut the cylinder and cover. An offset 85 in the cover creates a piston area 87 housing an annular free-floating piston 86 having a pressure seal 88 engaging the inner surface of the offset 85. A feed hole 89 is optionally located in the cylinder to fill the balancing piston cavity or area 87.

The rotating shaft 11c has an axial passage 41c that opens at the outer end to allow hydraulic pressure to enter the piston cavity 24c for movement of the cylinder 14c and pressure plate 32c. As there is no control valve for the hydraulic pressure, the retractor springs 31c are sufficiently preloaded to maintain a running clearance when the cavity 24c is charged with the idling line pressure. The piston area 87 is provided to cause a centrifugal head equal to the head in the cavity 24c to be in balance when the assembly is rotated. This assembly operates in substantially the same manner as the previous embodiments.

FIG. 6 discloses a fifth embodiment 91 of the clutch assembly which is substantially identical to the embodiment of FIG. 5, except that the rotating shaft 11d does not have a central passage extending therethrough. Instead, the piston 12d is retained on the tapered exterior shaft surface by a nut 92 threadingly engaging the end 60d of the shaft and having a central opening 93 for introduction of hydraulic fluid and a side opening 94 to feed the fluid to the piston cavity 24d. The exterior surface of the nut has an annular groove 95 for a pressure seal 16d engaging the inner flange 15d of the cylinder 14d, and the cylinder has a bleed hole 89d to allow fluid to enter the balancing piston cavity 87d housing the free floating piston 86d.

A sixth embodiment 96 is shown in FIG. 7 which is substantially identical to the embodiment of FIG. 5 except the rotating shaft 11e does not contain a central passage. A nut 59e threadingly engages the end 60e of the shaft 11e to retain the piston 12e thereon, and a plug 78e dead-ends the inner radial flange 64e of the cylinder 14e and has a central threaded opening 97 to receive a plug 99 of a rotating union assembly 98. The plug has a central passage 101 communicating with two or more radial passages 102 and opening at the inner end in spacing 103 between the shaft 11e and the flat plug 78e.

An annular groove 104 on the plug communicates with the radial passages 102 and is sealed by pressure seals 105,105 spaced axially on both sides of the groove. A stationary sleeve 106 encompasses the plug 99 and has a feed passage 107 communicating with a flexible hydraulic feed hose 108 suitably secured thereto. This assembly operates in the same manner as the embodiments of FIGS. 5 and 6.

A seventh embodiment 111 shown in FIG. 8 is substantially identical with the embodiment of FIG. 6 except that the passage 93f in the nut 92f receives the reduced end 113 of a non-rotating spout 112 having a pressure seal 114 engaging the interior surface of the passage or opening 93f. The spout is generally L-shaped and has a central L-shaped passage 115 leading to the side opening 94f in the nut. This embodiment also operates in the same manner as the structure of FIG. 6.

FIG. 9 discloses an eighth embodiment 116 of clutch assembly which is substantially identical to the embodiment of FIGS. 1 and 2 except for the absence of a control valve and central passage in the rotating shaft 11g. Instead, a short blind passage 41g is formed in the outer end 60g of the shaft. To the structure of FIG. 1 is added a nut 59g to retain the piston 12g on the shaft, and a clutch cover 79g mounted on the bolts 82g and spaced from the piston by sleeves 84g; the cover having an offset to provide a balancing piston cavity 87g for a free-floating piston 86g. This assembly operates in the same manner as FIG. 1 except the retractor springs 31g are preloaded to provide a running clearance at idle hydraulic pressure, and the piston cavity 87g and piston 86g are positioned to balance the centrifugal head of the piston cavity 24g to prevent an increase in plate load when the assembly is rotated.

We claim:

1. A hydraulically-actuated starting clutch comprising a piston operatively connected to a rotating shaft, a movable cylinder encompassing and sealingly engaging said piston to provide a pressure cavity therebetween, a friction plate facing said piston opposite to said cylinder and operatively connected to a driven shaft, a pressure plate secured to said cylinder for movement therewith and positioned on the opposite side of the friction plate from the piston, guide means between said piston and cylinder to cause simultaneous rotation thereof, a source of hydraulic fluid pressure actuated by the speed of the rotating shaft to pressurize said pressure cavity, said rotating shaft having a central passage therethrough for the introduction of the hydraulic fluid, said piston having a feed hole communicating between said shaft passage and the pressure cavity, and a yieldably biased reciprocable control valve received in an enlarged end of said shaft passage and adapted to uncover a side passage communicating with said feed hole at a predetermined pressure level, said control valve having a cylindrical body portion conformably received in said shaft passage, an annular groove in the exterior surface of said body and communicating with longitudinal slots in the rear end, and a reduced diameter nose forming with said passage an annular space adapted to communicate with said piston feed hole.

2. A hydraulically-actuated starting clutch as set forth in claim 1, in which a plug closes the open end of the passage and has a central drain opening, said control valve passage having a central recess opening towards said plug, and a compression spring with one end abutting said plug and the opposite end received in said recess.

3. A hydraulically-actuated starting clutch as set forth in claim 1, in which said guide means comprises a plurality of cylindrical pins secured in said piston and extending through openings in the reciprocable cylinder.

4. A hydraulically-actuated starting clutch as set forth in claim 3, wherein said pins have enlarged heads beyond said cylinder, and retractor springs encompassing said pins with the opposite ends abutting said cylinder and said enlarged heads.

5. A hydraulically-actuated starting clutch as set forth in claim 4, in which said pins are bolts threadingly engaging said piston.

6. A hydraulically-actuated starting clutch as set forth in claim 1, wherein said pressure cavity is located adjacent said rotating shaft and defined between a pair of annular pressure seals positioned on axially extending surfaces of said piston.

7. A hydraulically-actuated starting clutch as set forth in claim 1, in which said driven shaft encompasses and is concentric with said rotating shaft.

8. A hydraulically-actuated starting clutch as set forth in claim 1, in which said pressure cavity is spaced radially outward from the rotating shaft beyond said guide means, said cavity being defined between a pair of annular pressure seals, one of which is positioned on the outer periphery of said piston and the other is positioned on an axially extending surface on the piston beyond the guide means.

9. A hydraulically-actuated starting clutch comprising a piston operatively connected to a rotating shaft, a movable cylinder encompassing and sealingly engaging said piston to provide a pressure cavity therebetween, a friction plate facing said piston opposite to said cylinder and operatively connected to a driven shaft, a pressure plate secured to said cylinder for movement therewith and positioned on the opposite side of the friction plate from the piston, guide means between said piston and cylinder to cause simultaneous rotation thereof, said pressure cavity being spaced radially outwardly from the rotating shaft beyond said guide means, said cavity being defined between a pair of annular pressure seals, one of which is positioned on the outer periphery of said piston and the other is positioned on an axially extending surface on the piston beyond the guide means, said guide means including a plurality of bolts threadingly engaging said piston, a clutch cover having openings receiving said bolts adjacent the enlarged heads thereof and an axially extending flange with an annular pressure seal engaging said cylinder, and a retractor spring encompassing each said bolt with the opposite ends abutting the cylinder and the clutch cover, and a source of hydraulic fluid pressure actuated by the speed of the rotating shaft to pressurize said pressure cavity.

10. A hydraulically-actuated starting clutch as set forth in claim 9, wherein said pressure cavity is in direct communication with the source of hydraulic pressure and said retractor springs are preloaded so as to overcome the hydraulic pressure generated at idle rpm and provide a running clearance for the clutch.

11. A hydraulically-actuated starting clutch comprising a piston operatively connected to a rotating shaft, a movable cylinder encompassing and sealingly engaging said piston to provide a pressure cavity therebetween, a friction plate facing said piston opposite to said cylinder and operatively connected to a driven shaft, a pressure plate secured to said cylinder for movement therewith and positioned on the opposite side of the friction plate from the piston, guide means between said piston and cylinder to cause simultaneous rotation thereof comprising a plurality of bolts threadingly engaging the piston adjacent its periphery and extending through said cylinder, a clutch cover having openings receiving said bolts, a retractor spring encompassing each bolt with the opposite ends thereof abutting the cylinder and clutch cover, said cover having an offset providing a secondary pressure cavity, and a free floating annular piston in said last-mentioned cavity and having a pressure seal engaging said cover, and a source of hydraulic fluid pressure actuated by the speed of the rotating shaft to pressurize said pressure cavity.

12. A hydraulically-actuated starting clutch as set forth in claim 11, in which said secondary pressure cavity and free-floating piston act to balance the first-mentioned pressure cavity by being equal to the centrifugal head thereof to prevent an increase in plate load when the clutch is rotated.

13. A hydraulically-actuated starting clutch as set forth in claim 11, including a spacer sleeve encompassing each bolt and extending through said cylinder with the opposite ends thereof abutting the piston and clutch cover, said retractor springs encompassing said sleeves.

14. A hydraulically-actuated starting clutch as set forth in claim 11, in which said first-mentioned pressure cavity is in direct communication with the source of hydraulic pressure and said retractor springs are sufficiently preloaded to overcome the pressure at idle rpm and maintain a running clearance in the clutch.

15. A hydraulically-actuated starting clutch as set forth in claim 14, in which said rotating shaft has a central passage communicating with the source of hydraulic pressure, and said cylinder is closed by an end plate to define the pressure cavity.

16. A hydraulically-actuated starting clutch as set forth in claim 11, including at least one feed opening in the cylinder to allow fluid to exit from the said first-mentioned pressure cavity to said secondary pressure cavity.

17. A hydraulically-actuated starting clutch as set forth in claim 11, including a nut threadingly engaging said rotating shaft and having a central opening communicating with the source of hydraulic pressure and a side opening communicating with said first-mentioned pressure cavity.

18. A hydraulically-actuated starting clutch as set forth in claim 17, in which said cylinder has an axially extending inner flange in sliding engagement with said last-mentioned nut, and a pressure seal between the cylinder flange and nut.

19. A hydraulically-actuated starting clutch as set forth in claim 18, including a non-rotating spout sealingly received in the central opening in said nut, said spout communicating with the source of hydraulic pressure.

20. A hydraulically-actuated starting clutch as set forth in claim 11, including an end plate closing the inner periphery of said cylinder, and a rotating union connected to said end plate and to a flexible hose communicating with said source of hydraulic pressure.

* * * * *